US008868903B2

(12) United States Patent
Hermoni et al.

(10) Patent No.: US 8,868,903 B2
(45) Date of Patent: Oct. 21, 2014

(54) DIGITAL ARBITRATION

(71) Applicant: Ben-Gurion University of the Negev, Beer Sheva (IL)

(72) Inventors: Ofer Hermoni, Yavne (IL); Niv Gilboa, Tel Aviv-Yafo (IL); Shlomi Dolev, Omer (IL)

(73) Assignee: Ben-Gurion University of the Negev, Beer Sheva (IL)

( * ) Notice: Subject to any disclaimer, the term of this patent is extended or adjusted under 35 U.S.C. 154(b) by 14 days.

(21) Appl. No.: 13/648,787

(22) Filed: Oct. 10, 2012

(65) Prior Publication Data

US 2014/0101440 A1   Apr. 10, 2014

(51) Int. Cl.
*H04L 9/32* (2006.01)

(52) U.S. Cl.
CPC .................................. *H04L 9/3202* (2013.01)
USPC .......................................................... 713/156

(58) Field of Classification Search
CPC .................................................... H04L 9/3202
USPC .......................................................... 713/156
See application file for complete search history.

(56) References Cited

U.S. PATENT DOCUMENTS

| | | | | |
|---|---|---|---|---|
| 7,747,850 | B1 * | 6/2010 | Gordon et al. | 713/155 |
| 2007/0027746 | A1 * | 2/2007 | Grabowich | 705/10 |

OTHER PUBLICATIONS

M. H. Au, P. P. Tsang, A. Kapadia, and W. Susilo. BLACR: TTP-Free Black-listable Anonymous Credentials with Reputation. Indiana University Technical Report TR695, May 2011.
E. Brickell and J. Li. Enhanced Privacy ID: a Direct Anonymous Attestation Scheme with Enhanced Revocation Capabilities. In WPES, pp. 21-30. ACM, 2007.
J. Camenisch, S. Hohenberger, M. Kohlweiss, A. Lysyanskaya and M. Meyerovich. How to win the Clone Wars: efficient Periodic n-times Anonymous Authentication. In ACM CCS, pp. 201-210, 2006.
J. Camenisch and A. Lysyanskaya. An Efficient System for Non-transferable Anonymous Credentials with Optional Anonymity Revocation. In B. Pfitzmann, editor, Advances in Cryptology EUROCRYPT 2001, vol. 2045 of LNCS, pp. 93-118. Springer Verlag, 2001.
C. Diaz and B. Preneel. Accountable Anonymous Communication. Chapter in Security, Privacy and Trust in Modern Data Management, 2006.
R. Dingledine, N. Mathewson and P. Syverson. Tor: The second-generation onion router. In Proceedings of the 13th USENIX Security Symposium, Aug. 2004.
S. Dolev, N. Gilboa, and O. Hermoni. "Arbitrators in the Security Infrastructure", 2011.
P. Feldman. A practical scheme for non-interactive verifiable secret sharing. In Proceedings of the 28th IEEE Symposium on Foundations of Computer Science, pp. 427-437. IEEE, 1987.
M. K. Franklin and M. K. Reiter. Fair Exchange with a Semi-Trusted Third Party. In Proceedings of the 4th ACM Conference on Computer and Communications Security, 1-6, 1997.

(Continued)

*Primary Examiner* — Kambiz Zand
*Assistant Examiner* — Aubrey Wyszynski
(74) *Attorney, Agent, or Firm* — Venable LLP; Robert Kinberg (57) ABSTRACT

A method for resolving disputes between users in network communications using digital arbitration. The method comprising the steps of agreeing on a contract between the users and choosing a set of arbitrators; appealing to the arbitrators by a first user, if he/she suspects the second user violates the agreement; and giving the information needed to reconstruct a resource of the second user, if a large enough number of arbitrators agree that the second user actually violated the agreement.

2 Claims, 7 Drawing Sheets

(56) References Cited

OTHER PUBLICATIONS

N. Gal-Oz, E. Gudes and D. Hendler. A Robust and Knot-Aware Trust-Based Reputation Model. In International Federation for Information, pp. 167-182, 2008.

J. H. Hoepman. Revocable Privacy. In ENISA Quarterly Review, 5(2):Jun. 16-17, 2009.

S. Köpsell R. Wendolsky and H. Federrath. Revocable anonymity. In ETRICS'06, 206-220, 2006.

A. Shamir. How to share a secret,Commun, ACM, 22, 612-613, 1979.

M. Stadler. Cryptographic Protocols for Revocable Privacy. PhD thesis, Swiss Federal Institute of Technology, Zürich, 1996.

I. Teranishi, J. Furukawa and K. Sako. k-Times Anonymous Authentication (extended abstract). In Asiacrypt, v. 3329 of LNCS pp. 308-322, 2004.

P. P. Tsang, M. H. Au, A. Kapadia, and S. W. Smith. PEREA: Towards practical TTP-free revocation in anonymous authentication. In ACM CCS, pp. 333-344, ACM, 2008.

P. P. Tsang, M. H. Au, A. Kapadia, and S. W. Smith. BLAC: Revoking repeatedly misbehaving anonymous users without relying on TTPs. ACM Trans. Inf. Syst. Secur., 13(4):39, 2010.

P. P. Tsang, A. Kapadia, C. Cornelius, and S. W. Smith. Nymble: Blocking misbehaving users in anonymizing networks. IEEE Trans. Dependable Sec. Comput., 8(2):256269, 2011.

\* cited by examiner

DIGITAL ARBITRATION

FIELD OF THE INVENTION

The present invention relates to the field of network security infrastructure. More particularly, the present invention relates to security of network communication among users and servers.

BACKGROUND OF THE INVENTION

Publications and other reference materials referred to herein, including reference cited therein, are incorporated herein by reference in their entirety and are numerically referenced in the following text and respectively grouped in the appended Bibliography which immediately precedes the claims.

The number of transactions in the internet grows exponentially. The scalability of the internet is based on the distribution of tasks among the participants. Specifically, peer to peer, machine to machine, clients and servers execute independent transactions with no central controlling entity. A Certificate Authority (CA) is a prominent example of the opposite approach; a centralized entity that is heavily used as part of public key infrastructures or as part of the communication protocol to secure the transactions/communication in the internet. A user wishing to anonymously place a talkback in a website that operates under the present CA infrastructure, can not be revoked of his/hers anonymity, since the moderator of the website has no judgment whether to reveal the identity of the user or not. In extreme cases the website may appeal to a real judge and get a court order to reveal the IP address of the user, however if the user used anonymous surfing or was in a public place (e.g. internet cafe) then it will be impossible to reveal their identity.

Some ideas for anonymous systems that appear in the prior art are revocable privacy, anonymous credential systems, digital money and blacklisting. Hoepman [11] defines revocable privacy as designing systems in such a way that no personal information is available unless a user violates the pre established terms of service. Only in that case, his personal details (and when and how he violated the terms) are revealed to certain authorized parties. Stadler [14] defines cryptographic primitives for revocable privacy as fair blind signatures and publicly verifiable secret sharing. Later works use these primitives to achieve revocable privacy. The revocation mechanism of revocable privacy systems (e.g. [5, 12]) is initiated by a law enforcement entity and requires a central "judge" to decide whether the privacy should be revoked or not. Franklin [9] proposes the use of a single semi-trusted entity in a fair exchange environment, the third party is assumed not to collude with either of the other (client and server) parties. Moreover, if both parties are honest then they both learn each other's document. Users in anonymous credential systems (e.g. [4]) communicate anonymously with different servers in an unlinkable fashion. The CA (or open authority as it is called in those systems) issues the credentials to the users and the same entity may revoke the anonymity of the users. Another group of solutions is "k-times anonymous authentication" (k-TAA) systems [15]. As implied by their name, these systems provide anonymous authentication k times. Until the $k_{th}$ time, no one (not even the trusted party) can identify the user, whereas in the k+1 attempt, the anonymity of the user is revoked. The trusted party is involved only in the registration stage, hence, the server can revoke user anonymity by itself. Camenisch [3] extend k-TAA to allow k anonymous authentications in a single time period. Namely, after a predefined period of time, the counter is set to zero, and k is recounted. Other systems (e.g. [2, 16, 17, 18]) use blacklists in order to prevent the user from receiving service, whereas the anonymity of a misbehaving user is not revoked. Au [1] extends these works by adding reputation scores to anonymous users.

Methods for improving the deficiencies of the prior art have been presented, by the inventors of the present application, in [7].

It is a purpose of the present invention to provide a method for anonymous user to user network interactions.

It is an additional purpose of the present invention to provide a method for resolving disputes between users in network communications.

It is a further purpose of the present invention to provide a method for secure user to user network transactions.

Further purposes and advantages of this invention will appear as the description proceeds.

SUMMARY OF THE INVENTION

The invention is a method for resolving disputes between users in network communications using digital arbitration, wherein the network comprises member users, a server, a set of arbitrators and a certificate authority (a centralized entity that is used as part of a public key infrastructure or as part of the communication protocol to secure the communication), comprising the following steps:
  a) agreeing on a contract between the users, said contract comprising:
      i. a terms of use agreement, defining what each user may do during the communication;
      ii. a set of chosen arbitrators; and
      iii. a digital resource that a first user receives, in case the second user violates the agreement;
  b) checking the users digital resource, by the certificate authority, so that the resource, guaranteed in the contract, is partially distributed to each of the arbitrators;
  c) signing the user's public key, by the certificate authority, for future verifications;
  d) appealing to the arbitrators by a first user, if he/she suspects the second user violates the agreement; and
  e) giving the information needed to reconstruct the resource by the set of arbitrators to the first user, if a large enough number of arbitrators agree that the second user actually violated the agreement.

In embodiments of the invention, the method may be with one of the users as an agency, implemented by a server of the network.

In embodiments of the invention, the set of arbitrators in a network may be selected from the following group:
  a. full members of the network, as the users;
  b. external participants, being non-members of the network;
  c. members of the central certificate authority; and
  d. machines.

In embodiments of the invention, anonymous user to user network interactions may comprise the following steps:
  a) sending to the server, by the user, a message that contains an identifier for the user $ID_U$ and a set of preferred arbitrators ar;
  b) sending from the server a message to the user containing a terms of use agreement and a set AR, containing n arbitrators ($n \geq 2t+1$, where t is a system parameter) from ar, where the terms of use contains the number of arbitrators n, the threshold t, the type of the digital goods (resource from the user), etc;

c) checking the terms of use and if the user does not agree to the terms of use, the user sends an error message to the server;

d) using a reputation system to support the users and servers choice of arbitrators;

e) constructing by the user a random polynomial of degree "t", by a user with digital goods, $A = DG + a_1 x + a_2 x^2 + \ldots + a_t x^t$ mod q, where q is a global prime number, $a_i$ are random and the free coefficient is the digital goods;

f) constructing by the user a pair of signature key ($SK_U$) and verification key ($VK_U$) by the user, where each message in the communication is signed by the user using the signature key, and verified by the server using the verification key;

g) sending from the user a message to the certificate authority, containing the polynomial A, a generator g, the user identifier $ID_U$, the verification key $VK_U$ and the Terms of Use;

h) checking by the certificate authority that the polynomial A is of degree t, and that the value A(0) is a valid digital good;

i) signing by the certificate authority the user's verification key ($Sig_{CA}(VK_U)$) and the terms of use ($Sig_{CA}(ToU)$), and then building a commitment C for the polynomial A according to a VSS algorithm, $C = \{g, c_0 = g^{DG}, c_1 = g^{a1}, \ldots, c_t = g^{at}$ mod p$\}$ where p is a prime number, g is a generator of a subgroup of size q in $Z^*_p$ and q|p−1;

j) sending by the certificate authority the commitment C along with the signatures on the user verification key and the terms of use to the user;

k) forwarding the message received from the certificate authority to the server, containing the commitment C, the certificate authority's signatures on the user verification key and the certificate authority's signatures on the terms of use, and verifying the signatures and the terms of use by the server;

l) constructing n shares $\{sh_1 = A(1), sh_2 = A(2), \ldots, sh_n = A(n)\}$, by the user, from the polynomial A, where n is a system parameter set in the terms of use, and $n \geq 2t+1$ (where t is the degree of the polynomial);

m) sending n messages, by the user, one message to each arbitrator $Ar_i$ ($1 \leq i \leq n$) from the vector AR, containing the identifier of the user $ID_U$, the terms of use, the commitment C, the user verification key $VK_U$ and the $i_{th}$ share (i is the location of the arbitrator in the set AR) $sh_i$;

n) sending n messages, by the server, one message to each arbitrator $Ar_i$ ($1 \leq i \leq n$) from the vector AR, containing the identifier of the user $ID_U$, the terms of use, the commitment C, the user verification key $VK_U$ and the index i, where i is the location of the arbitrator in the set AR;

o) checking, by each arbitrator, that the terms of use, $ID_U$, C and $VK_U$ sent from the server are identical to those sent from the user, and using the commitment C in order to verify that the received share, $sh_i$ from the user, is the correct $i_{th}$ (i received from the server) share;

p) sending an OK message, by each arbitrator, to the user; and q) sending an OK message, by each arbitrator, to the server.

The method may further comprise the following steps:

a) sending, by the server, to each arbitrator i, the identifier of the user $ID_U$, the messages M and the signatures $Sig_U(M)$;

b) verifying, by each arbitrator i, the signature of the user on the messages, and using an computable function f to decide whether the c) sending the share $sh_i$ to the server, if the arbitrator decides that the messages do violate the terms of use.

All the above and other characteristics and advantages of the invention will be further understood through the following illustrative and non-limitative description of embodiments thereof, with reference to the appended drawings.

DETAILED DESCRIPTION OF THE INVENTION

The invention provides the use of additional semi-trusted entities to relieve the load of tasks handled by a CA. The entities are called "arbitrators". There is a need for arbitrators in the scope of anonymous transactions, as anonymity is an important feature for users that want to preserve their privacy in the internet and in general in communication networks. Anonymity, however, can be abused to perform illegal actions, without fear of reprisal or of legal proceedings. Thus, designing systems that support positive anonymity is of great importance. Arbitrators in the real world are used to resolve disputes between two parties outside the court of law. The parties in a dispute agree that a third party (or parties), generally self-contained (neutral), will resolve their dispute. The resolution of the arbitration process is binding for both parties.

The invention introduces the notion of digital arbitration which enables resolving disputes between servers and users (or between two users) with the aid of arbitrators. Arbitrators are semi-trusted entities that facilitate communication or business transactions in a social or other network. The communicating parties, users and servers, agree before a communication transaction on a set of arbitrators that they trust (reputation systems may support their choice). Then, the arbitrators receive a resource (digital goods), e.g. a membership in a social network and for business transactions, a deposit, and terms of use agreement between participants such that the goods of a participant are returned if and only if the participant acts according to the agreement. The usage of arbitrators in the scope of conditional (positive) anonymity is demonstrated as a user may interact anonymously with a server as long as the terms for anonymous communication are honored. In case the server suspects a violation of the terms, the server provides proof to the arbitrators that a violation took place and, if enough of the arbitrators agree, the identity of the user is published. Since arbitrators may be corrupt or become corrupted, the scheme ensures that only a large enough set of arbitrators may reveal the identity of the user, which is the resource in the case of conditional anonymity.

An arbitrator can be a semi-trusted peer in a social network or an agency (implemented by servers in the system) that gains reputation for being trusted in a distributed reputation system. The number of certificate authorities is very small and the information they have is highly classified. In contrast, the number of arbitrators can be huge (e.g., each peer can act as an arbitrator) and the information given to each arbitrator is limited. In fact the participants may decide to distribute the information amongst a set of arbitrators; thus, ensuring that no information is revealed as long as a large enough subset of arbitrators is honest. The penetration of social networks into every day life activities boosts the opportunities for collaboration among peers that trust each other to a certain degree according to their past reputations, as well as new social structures and habits. One social infrastructure and judgment process may be considered as a "court of law" and the arbitrators may be considered as the "jury" in court. With the opportunities that the current digital cyber social networks technology enables, it is possible to define, design and facilitate digital arbitration by digital arbitrators.

The invention provides the use of arbitrators in the digital world that resemble arbitrators in the real world. They are peer-to-peer (P2P), semi-trusted, entities that function as a jury in the technology court of law. However, there are naturally a few differences. There is more than one arbitrator, the sanction that takes place in case of violation is set in advance and only a collaboration of enough arbitrators is allowed to carry out the sanction.

Interaction between a user and a server in this setting occurs as follows. At the beginning of the initial phase of the communication between the two parties, user and server (or user and user in a symmetric scenario), agree on a contract. The contract contains three parts. A Terms of Use agreement (ToU) that defines what is legitimate, namely what the user is allowed to do during the communication; a set of arbitrators; and a resource the server receives in case the user violates the agreement. If the user violates the agreement, then the server applies to the arbitrators, and if a large enough set of arbitrators agree that the user actually violated the agreement, they give the server the information that is needed to reconstruct the resource. The ToU can be stated as an agreed algorithm that outputs whether the interaction is legal or not. On the other hand, the ToU may be much less strict allowing the operator of the arbitrators to use their (partially trusted) common sense. The scheme requires a trusted party such as a Certificate Authority (CA) in the initial stage. The CA must vouch for the users' digital resource, otherwise the server cannot be sure that the guaranteed resource is indeed distributed to the arbitrators. In addition, the CA must sign the user's public key so that the server can verify messages from the user, and prove to the arbitrators that the user is actually in violation of the agreement.

The invention can be applied in many different types of scenarios, for example:

Social Networks—The scheme of the invention can be modified to guarantee that members of a social network live up to agreed upon expectations and standards of the network and, under agreed upon conditions, to apply sanctions against members that do not conform.

Gambling and betting—The general scheme can be modified to allow a trustworthy betting environment in which the participants cannot cheat and always have to pay their debts.

Anonymous betting—A trustworthy betting environment, where a user may be anonymous and participate in a wager.

P2P gambling—A peer to peer gambling environment, with no central authority that controls over the system.

P2P anonymous gambling—A peer to peer gambling environment, with no central authority that controls the system and users are anonymous.

Gaming—A server to user gaming environment (e.g. online chess played against a software), where the users are obligated to the agreed conditions and cannot cheat.

P2P gaming—A peer to peer gaming environment (e.g. online chess played against another user or an online multiplayer game), where the users are obligated to the agreed conditions and cannot cheat.

P2P anonymous gaming—A peer to peer gaming environment (e.g. online chess played against another user or an online multiplayer game), where the users are anonymous and obligated to the agreed conditions and cannot cheat.

Auction bids—A trustworthy bidding environment, where each user keeps their anonymity and each bid is irreversible so that if a bid wins the user have to pay.

Blind paper review—A modified environment for reviewing academic papers where the paper is examined anonymously (instead of the current state where the paper is submited to the editor who chooses a panel to examine the paper with the names of the authors removed).

In the business world the general scheme can be applied, for example, to implement a notion of bonds in the digital world. The scenario is that two users agree on a contract. The contract contains a ToU, a set of arbitrators, and two bonds that each user issues to the other guaranteeing payment in case of a violation. Each user can cash the bond only in if the other party violates the agreement. Before the communication starts, a CA (e.g. bank) issues the bonds, the users distribute shares of the bond to the arbitrators.

Figure 1:
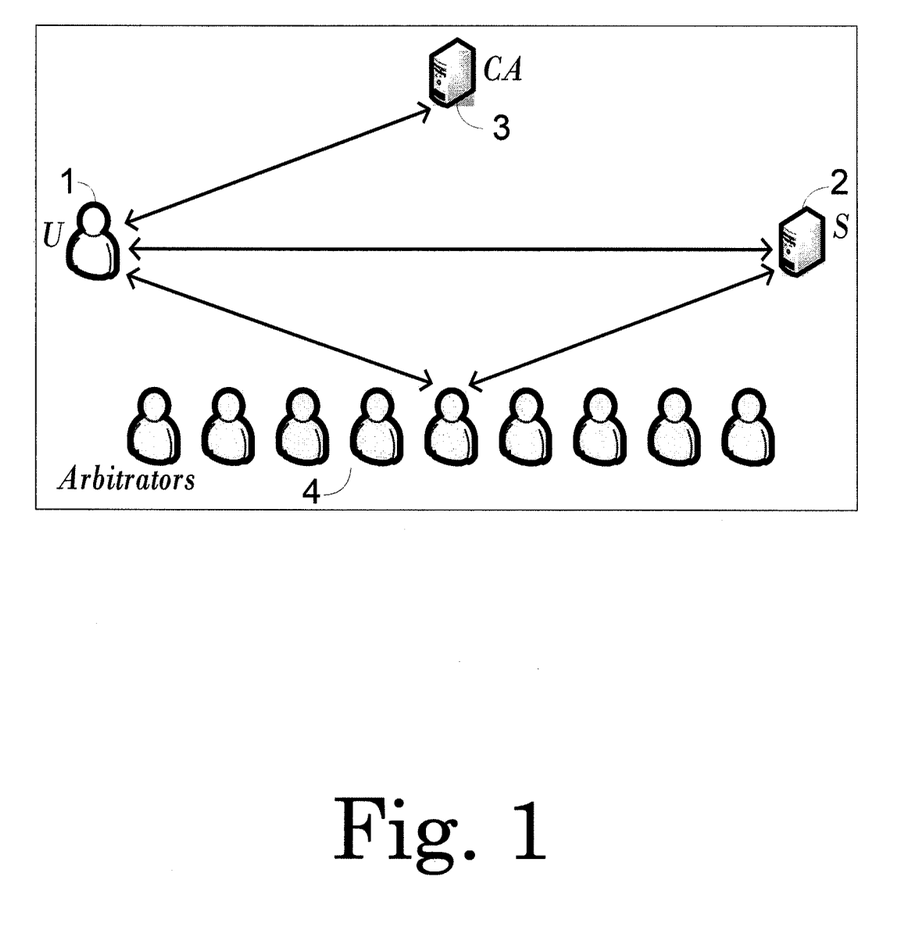
FIG. 1 illustrates the entities and the connections between them.

To illustrate the invention in more detail the basic scenario of digital arbitration, i.e. the user—server scenario is considered. A first example is conditional anonymity in the user—server model. The second example is digital bonds in the user—user model. The digital arbitration environment is comprised of four entities. User U, server S, certificate authority CA, and a set of arbitrators AR. FIG. 1 illustrates the entities and the connections between them. The server (2) provides a service to the user (1). The CA (3) verifies the means that are needed for the arbitration process (e.g. validates the digital goods). And the arbitrators (4) decide whether to give the digital goods to the server (2) or not. All messages in the scheme are sent on communication channels, these channels are considered to be reliable. The channel between the user (1) and the CA (3) is authenticated.

The goal of the server is to provide a service. With the property of "server security", if a user that gets this service violates the agreement, then the server obtains the digital goods with the aid of the arbitrators. With the property of "user security", as long the user does not violate the agreement, the digital goods remain hidden from the server. Each party (user or server) may be dishonest in its dealings with the other party. That is, the user may try to hide the digital goods even if it violates the agreement and the server may try to acquire the digital goods even if the user does not violate the agreement. Moreover, up to t arbitrators can be malicious and cooperate with either a dishonest user or a dishonest server (an arbitrator that is under a man in the middle attack is considered to be dishonest since its share may leak). In order to guarantee user and server security, one must have at least n, $n \geq 2t+1$ arbitrators in the scheme. This number of arbitrators assures that at least $t+1$ arbitrators cooperate with the server in case of user violation.

An efficiently computable function is defined as f:(ToU, M)→(0, 1). The function f receives a Terms of Use agreement (ToU) and set of messages M, and outputs 0 in case that the messages do not violate the ToU, or outputs 1 if the messages do violate the ToU.

Honest Arbitrator—

An honest arbitrator i is an arbitrator that given a set of messages M and a Terms of Use agreement ToU, outputs its share, $sh_i$, if f(ToU, M)=1 and otherwise outputs ⊥ (false).

User Security—

Let all the arbitrators receive ToU. A digital arbitration scheme ensures user security if for any set of messages M signed by the user such that f(ToU, M)=0, if there are at most t dishonest arbitrators, then the server does not receive any information on the digital goods (DG).

Server Security—

Let all the arbitrators receive ToU. A digital arbitration scheme ensures server security if for a given set of messages M signed by the user such that f(ToU, M)=1, if there are at least t+1 honest arbitrators, then the server receives the digital goods (DG).

In one embodiment of the invention, the method has three phases, initialization, communication and arbitration.

A. Initialization

Figure 2:
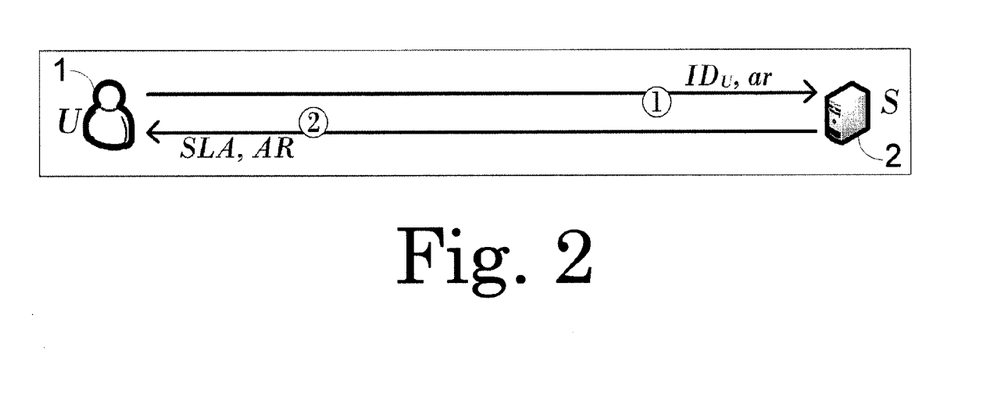
FIG. 2 illustrates steps 1-2 of the initialization phase.

The user and the server participate in the first two steps of the initialization phase (shown in FIG. 2).

Step 1—the user (1) sends to the server (2) a message that contains an identifier for the user $ID_U$ and a set of preferred arbitrators ar, where ar={$Ar_1, Ar_2, \ldots, Ar_m$}. The number of the arbitrators in the set is large enough, and allows the server to select enough arbitrators in step 2.

Step 2—the server (2) sends a message to U. The message contains a Terms of Use agreement ToU and a set AR. The set AR={$Ar_1, Ar_2, \ldots, Ar_n$} contains n arbitrators (n≥2t+1, where t is a system parameter and the threshold of the secret sharing algorithm) from ar, these are the actual arbitrators that are used in the arbitration phase. Among others, the ToU contains n the number of arbitrators, the threshold t, the type of the digital goods, etc. If the server (2) and user (1) cannot agree on systems parameters (e.g. n, t, list of arbitrators and ToU) the algorithm halts. When receiving the ToU, the user (1) checks it and if the user (1) does not agree to the ToU, the user (1) sends an error message to the server (2), and the algorithm halts. In step 1 and step 2 the user (1) and the server (2) agree on AR and on the ToU. The server (2) and the user (1) use a reputation system to support their choice of arbitrators.

The next three steps (shown in FIG. 3) are performed between the user and the CA and between the user and the server.

Figure 3:
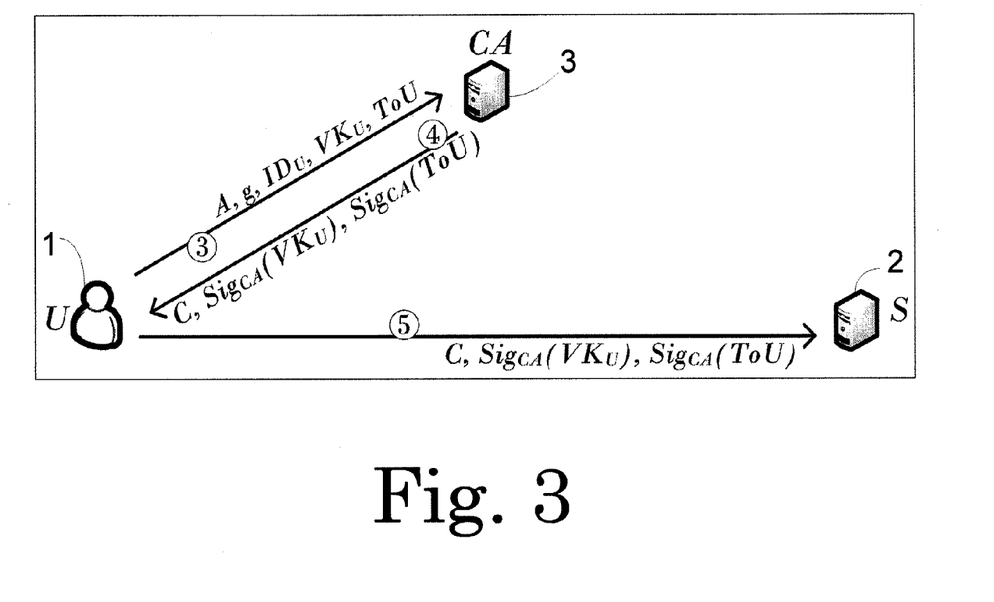
FIG. 3 illustrates steps 3-5 of the initialization phase.

Step 3—let p, q be prime numbers, q|p−1 (i.e. q is an integral divisor of p) and let g be a generator of a subgroup of size q in $Z^*_p$. The user U (1) with digital goods DG constructs a random polynomial A (with random coefficients) of degree t, $A=DG+a_1 x+a_2 x^2+\ldots+a_t x^t \bmod q$, where the $a_i$ are random and the free coefficient is the digital goods. The user (1) also constructs a pair of signature key ($SK_U$) and verification ($VK_U$) key. Each message in the communication phase is signed by the user (1) using the signature key, and verified by the server (2) using the verification key. U (1) sends a message to the CA (3), the message contains the polynomial A, the generator g, the user identifier $ID_U$ the verification key $VK_U$ and the ToU.

Step 4—upon receiving the messages in step 3, the CA (3) performs the following checks. The CA (3) checks that the polynomial A is of degree t (defined in the ToU), and that the value A(0) is a valid DG (which means that the DG follows the definition in the ToU). If at least one of the tests fails, the CA (3) sends an error message to the user (1) and the algorithm halts. Otherwise, the CA (3) signs the user's verification key ($Sig_{CA}(VK_U)$) and the ToU ($Sig_{CA}(ToU)$), and then builds a commitment C for the polynomial A according to a VSS algorithm (Feldman [8]), C={g, $c_0=g^{DG}, c_1=g^{a_1}, \ldots, c_t=g^{a_t}$ mod p}. The CA (3) sends the commitment C along with the signatures on the user verification key and the ToU to the user (1).

Step 5—the user (1) forwards the message received from the CA (3) in step 4 to the server. The message contains the commitment C, the CA's signatures on the user verification key and the CA's signatures on the ToU. The server (2) verifies the signatures and the ToU, if the server (2) cannot verify, then the server sends an error message and the algorithm halts.

The last four steps in the initialization phase (shown in FIG. 4) are performed between the user and each arbitrator and the server and each arbitrator.

Figure 4:
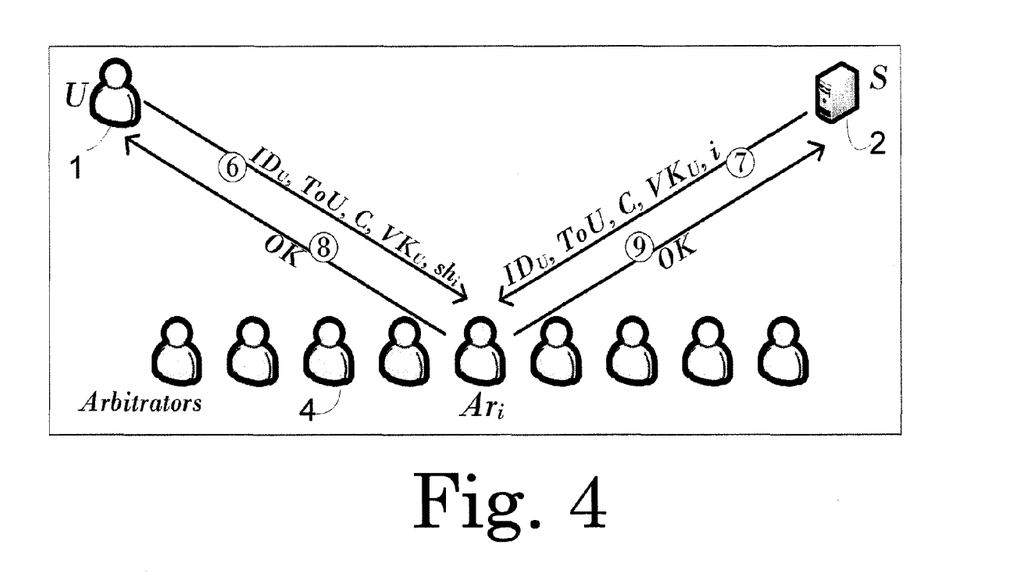
FIG. 4 illustrates steps 6-9 of the initialization phase.

Step 6—according to Shamir secret sharing [13], user U (1) constructs n shares {$sh_1=A(1), sh_2=A(2), \ldots, sh_n=A(n)$} from the polynomial A, where n is a system parameter set in the ToU, and n≥2t+1 (where t+1 is the degree of the polynomial). The user (1) sends n messages, one message to each arbitrator $Ar_i$ (1≤i≤n) from the vector AR. The message contains the identifier of the user $ID_U$, the ToU, the commitment C, the user verification key $VK_U$ and the $i_{th}$ share (i is the location of the arbitrator in the set AR) $sh_i$.

Step 7—the server (2) sends n messages, one message to each arbitrator $Ar_i$ (1≤i≤n) from the vector AR. The message contains the identifier of the user $ID_U$, the ToU, the commitment C, the user verification key $VK_U$ and the index i, where i is the location of the arbitrator in the set AR.

Upon receiving the messages in step 6 and step 7, each arbitrator i performs several tests. The arbitrator (4) checks that the ToU, $ID_U$, C and $VK_U$ sent from the server are identical to those sent from the user. In addition, according to the VSS algorithm, the arbitrator uses the commitment C in order to verify that the received share, $sh_i$ (received from the user), is the correct $i_{th}$ (i received from the server) share in the secret sharing scheme, this is performed in the following way:

$$g^{sh_i} \equiv c_0 \cdot c_1^i \cdot c_2^{i^2} \ldots c_t^{i^t} \bmod p$$

$$\equiv \prod_{j=0}^{t} c_j^{i^j} \bmod p$$

$$\equiv \prod_{j=0}^{t} g^{a_j i^j} \bmod p$$

$$\equiv g^{\left(\sum_{j=0}^{t} a_j i^j \bmod q\right)} \bmod p$$

If all tests succeed, the arbitrator continues to steps 8 and 9 (shown in FIG. 4). Otherwise, (if at least one of the tests fails), the arbitrator sends error messages to the user and the server and the algorithm halts.

Step 8—the arbitrator (4) sends an OK message to the user (1). If the user (1) receives an OK message from all n arbitrators (4), than the user (1) continues to the communication phase, otherwise the algorithm halts.

Step 9—the arbitrator (4) sends an OK message to the server (2). If the server (2) receives an OK message from all n arbitrators (4), than the server (2) continues to the communication phase, otherwise the algorithm halts.

B. Communication

Figure 5:
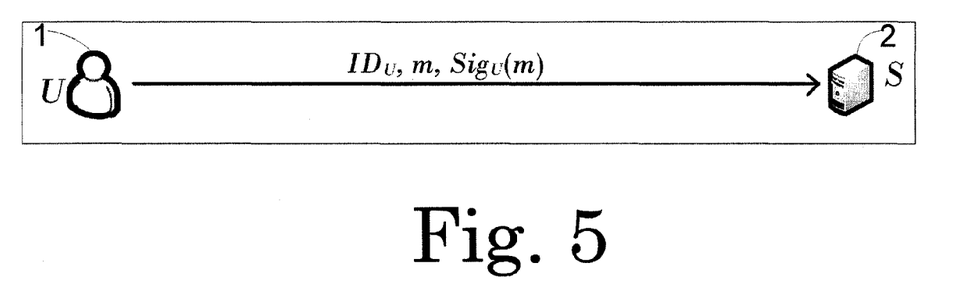
FIG. 5 illustrates the communication between the user and the server.

In this phase the user and the server communicate according to the ToU. Each message the user sends to the server is signed by the user signature key $SK_U$, and verified by the server using the verification key $VK_U$ (shown in FIG. 5). The server (2) accepts only signed messages. If the server (2)

suspects that one or more messages sent from the user (1) violate the ToU, the server (2) continues to the arbitration phase.

C. Arbitration

Let M={$m_1, m_2, \ldots$} be a set of messages that the user sent to the server, which the server believes violate the ToU, and let $Sig_U(M)$ be the signatures on these messages. The server initiates an arbitration phase in step 1 (shown in FIG. 6).

Figure 6:
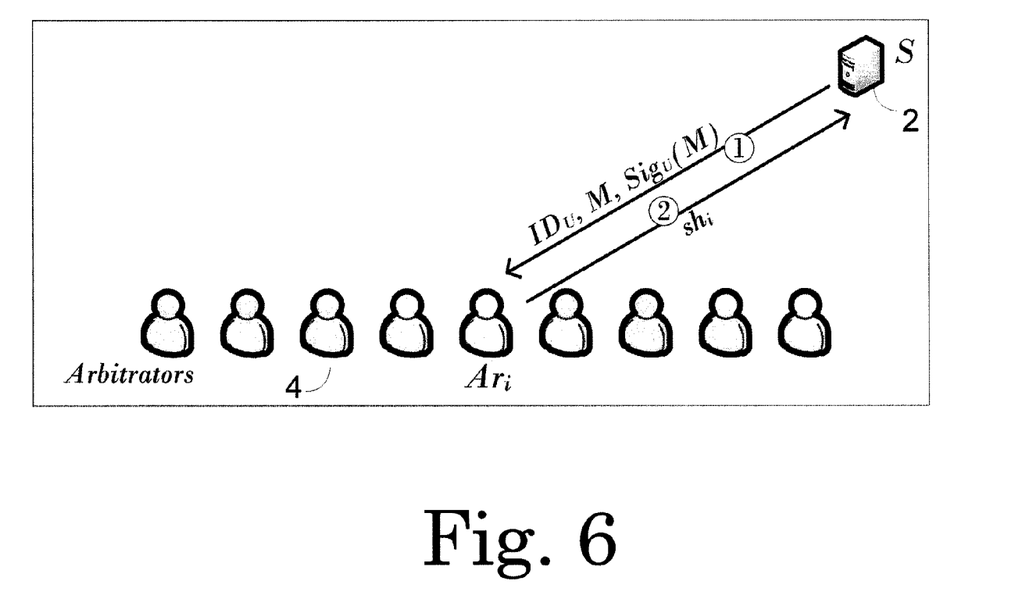
FIG. 6 illustrates steps 1-2 of the arbitration.

Step 1—to each arbitrator i, the server (2) sends the identifier of the user $ID_U$, the messages M and the signatures $Sig_U(M)$.

Step 2—each arbitrator i verifies the signature of the user on the messages, and uses f to decides whether the messages violate the ToU or not. An honest arbitrator (4) that decides that the messages do violate the ToU, sends the share $sh_i$ to the server.

The server uses C according to the VSS algorithm to verify that any received share, $sh_i$ is a correct share in the secret sharing scheme, this is performed in the same way as the arbitrators do in step 7 of the initialization phase. If the share is not correct then the server discards it. If enough (at least t+1) shares are received and verified, the server can reconstruct the digital goods by using the inverse of the secret sharing algorithm.

To support the selection of the arbitrators by users and servers, a reputation system is used. The goal is to reduce the use of corrupted arbitrators by users and servers. Since the reputation of an arbitrator is two dimensional, one score is aggregated from the users and the other from the servers. In a "knot based" reputation system [10], each dimension of reputation is presented as a different knot. At the end of a session between a user and a server, each one of them grades the arbitrators according to their activity during the session. For example, if a server believes that the ToU was violated, but a specific arbitrator did not send the share, the server will probably give that arbitrator a low reputation score.

For a security analysis of the system, the following is defined:

Good Polynomial—A polynomial A(x) over GF(p) is good, if A(x) is of degree t, and A(0)=DG.

Good Share i—A share $sh_i$ is good, if A(x) is a good polynomial and A(i)=$sh_i$.

Good Commitment—A commitment C is good, if there is an efficient algorithm that receives as input C and $sh_i$, $sh_i \in GF(p)$, and verifies that there is a good polynomial A(x) such that A(i)=$sh_i$.

Theorem 1: If the VSS algorithm is secure and the digital signatures are unforgeable. At the end of the initialization phase described above, if at least one of the server and the user is honest, then they both continue the scheme only if two conditions are met:

1. The server and the user agree on the ToU and on the set of arbitrators AR. In addition, every honest arbitrator receives the same verification key $VK_U$ and ToU from the user and the server.

2. There exists a polynomial A(x) over GF(p) of degree t such that every honest arbitrator i from the set AR holds a share $sh_i$=A(i) and A(0)=DG.

Proof 1: If the first condition is not satisfied then the theorem follows naturally from the steps taken in the initialization phase. If the server and the user don't agree on the ToU and the set of arbitrators AR in steps 1 and 2 of the initialization phase, then they halt. Steps 6 and 7 of the initialization scheme ensure that any honest arbitrator receives the same ToU. Since at least one of the user and server is honest, at least one of them (the honest one) sends the correct ToU to each arbitrator. Unless the other party sends the same ToU, the arbitrator sends error messages to the server and the user after step 7, and since one of them is honest the scheme stops. If an arbitrator i receives a share $sh_i$ that is not 'good', then the arbitrator sends error messages to the server and the user and the algorithm halts. We assume that the CA is honest; hence the commitment C is a 'good' commitment. Therefore, each honest arbitrator that receives a bad share, and uses C, detects that the share is not 'good' and sends error messages to the server and the user. Since at least one of them is honest, the algorithm halts.

Theorem 2: Let n be the number of arbitrators and let t be a bound on the number of malicious arbitrators. If the VSS algorithm is secure and if the digital signatures are unforgeable, then the scheme described above provides user security.

Proof 2: The arbitration phase ensures that each honest arbitrator that receives M and $Sig_U(M)$ where f(ToU, M)=0 will not send the share to the server. Since M is signed, the server can't convince an honest arbitrator that f(ToU, M)=1. Assuming that there are at most t dishonest arbitrators, the server receives at most t shares of the secret. Since the VSS algorithm does not reveal any information on the secret if the number the received shares is less than t+1, the scheme ensures user security.

Theorem 3: let n be the number of arbitrators and let t be a bound on the number of malicious arbitrators. Assume that the VSS algorithm is secure, that the digital signatures are unforgeable and that n≥2t+1. The scheme described above provides server security.

Proof 3: According to Theorem 1, each honest arbitrator i that receives M and $Sig_U(M)$ where f(ToU, M)=1 sends $sh_i$ to the server. Furthermore, by the properties of VSS the server can discard any incorrect share. Since each share sent from a different honest arbitrator is a good share, and there are at least t+1 honest arbitrators, the secret sharing scheme ensures that the polynomial can be reconstructed, hence the serve receives DG.

Figure 7:
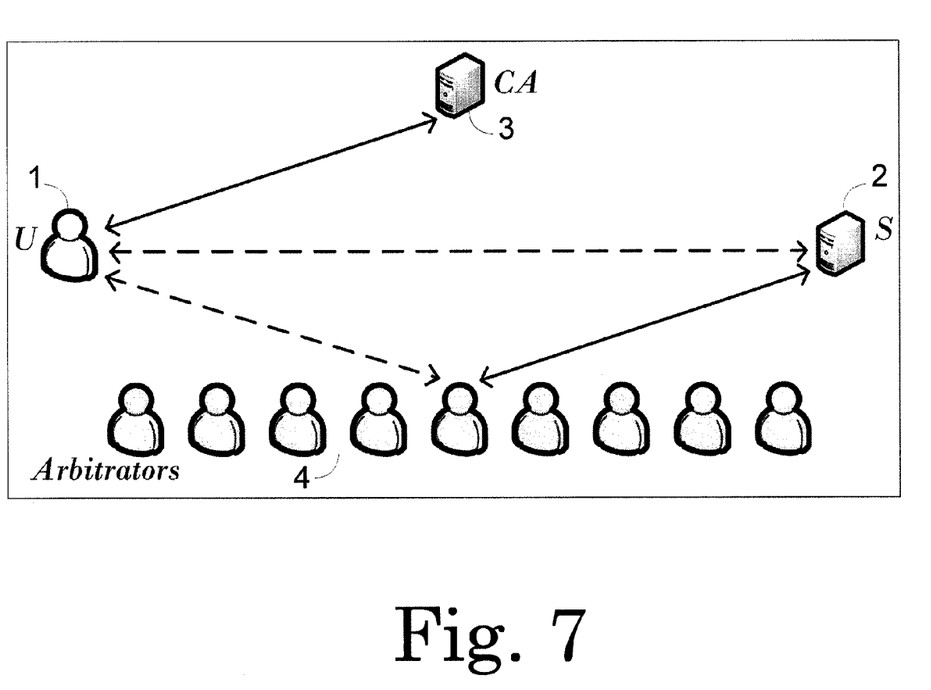
FIG. 7 illustrates the conditional anonymity environment.

An important application for the arbitration concept is the conditional anonymity (shown in FIG. 7, where the dashed communication channels are anonymous). Anonymous networks (e.g. Tor [6]) allow users to communicate anonymously. Although anonymity is crucial in some situations (e.g., freedom of speech), it is problematic in others (e.g., copyright laws). In the conditional (positive) anonymity environment a user communicates anonymously with a server, if and only if the user follows a set of well-defined behavioral norms (or predefined rules). For example, with the object of allowing users to post a message anonymously on a bulletin board, but a user who wants to write information assisting terrorism will not be able to preserve their anonymity. In order to achieve a conditional anonymity environment, the general digital arbitration scheme described above must be adjusted. First, that the CA must identity users. Just like the CA in the general scheme, this CA is trusted by all participants. Second, the identifier of the user $ID_U$ is replaced by a pseudonym, such that the user is uniquely identified among all users. Prior to step 1 of the initialization scheme the user has to apply to the CA in order to get a pseudonym. Third, the digital goods DG is the identity of user (e.g., social security number). Last, the communication channels are anonymous, which means that the identity of the user is not revealed by the communication itself.

Since the invention uses anonymous circuits (i.e. tunnels) to provide anonymity, the communication itself does not reveal information about the identity of the user (the DG). Hence the server receives information on the DG only from the arbitrators, and by Theorems 2 and 3 conditional anonymity is revoked if and only if the user violates the ToU. All security considerations taken into account in the general scheme are still valid for conditional anonymity.

The digital bond environment (shown in FIG. 8) is composed of two users (1, 1') that agree on a contract. The contract contains a Terms of Use agreement ToU and a set of arbitrators (4). Each user (1) may issue a bond to the other user (1'). A bond is a guarantee to pay the other party a certain amount of money. The bonds remain secret and therefore cannot be cashed as long as the agreement is not violated. In steps 1 and 2 of the initialization phase, both users (1, 1') agree on the set of arbitrators (4), and the ToU. In addition, each one of them sends to the other a verification key. In steps 3-5 of the initialization phase, they both apply to the CA (3), which in this case is a financial institute (e.g. a bank). Each one of them gives a different polynomial with a digital bond as the digital goods. They also give g, identifiers for both users (1), the ToU and the verifications keys. They both receive two commitments (one for each polynomial) and a signature of the CA (3) on the other party's verification key. Steps 6-9 are similar to the general scheme, they both send to each arbitrator the identifiers, the ToU, the commitments, the verification keys, the shares and the index of the arbitrator. If all tests of all arbitrators (4) pass, they continue to the communication phase.

Figure 8:
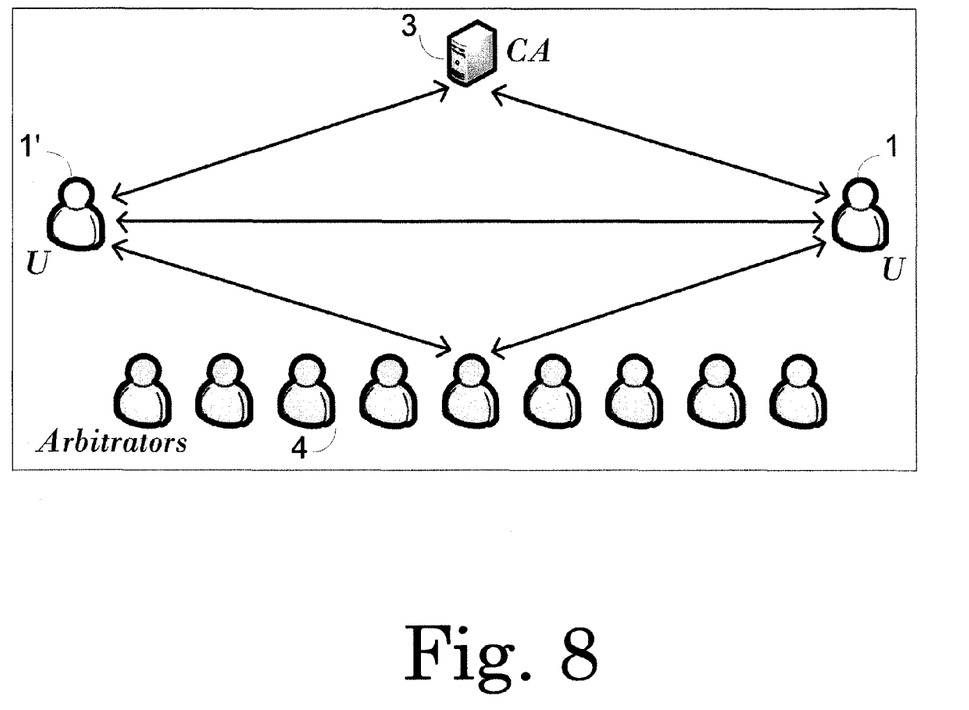
FIG. 8 illustrates the digital bonds environment.

The communication phase is performed in an undeniable way, which means that each user signs its own messages. Arbitration is done independently by each user as described in the general scheme. If t+1 arbitrators send the shares of user a to user b, then the digital bond of user a is revealed and can be cashed. The security of this solution is derived directly from Theorems 2 and 3.

Figure 9:
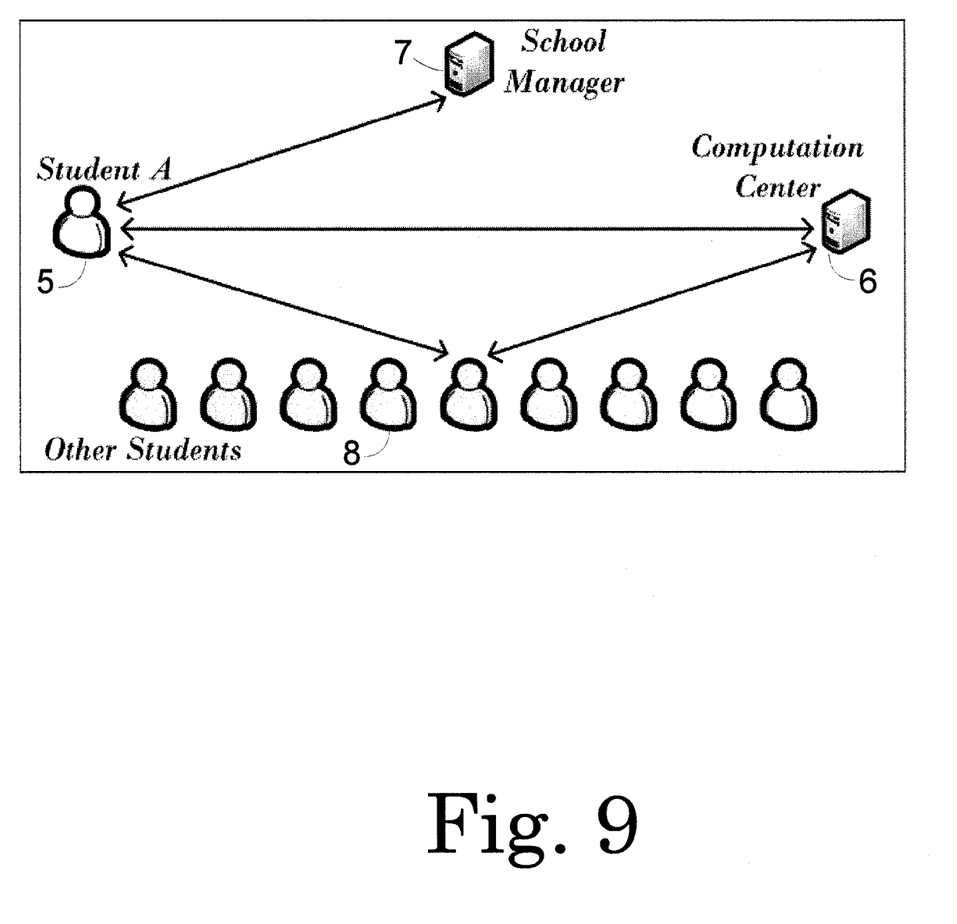
FIG. 9 illustrates of the example of participants in social networks.

An example of how the invention works in a social network is a fictional social network for high school students. On joining the network, users will agree to certain rules, e.g. while it is allowable to post uncomplimentary items about other members of the network it is not permissible to slander or fabricate lies. Violation of this rule will result in permanent exclusion from the network. Violating other rules may result in other types of sanctions. In order to decide if a rule has been broken each user agrees that a complaint by any user that another user has violated one of the rules will be sent to an a panel of arbitrators, each of which possesses a share of the identification of the accused user. The participants of the social networks appear in FIG. 9. One day student A (5) posts an anonymous item on fellow student B's webpage describing a party at which B allegedly became drunk. Many other users (some friends of B and some not and some who were present at the party and some who weren't) post items on B's webpage in reaction to the initial item. B files a complaint to the computation center (6) that manages the network complaining that the item is grossly inaccurate and slanderous. The computation center (6) sends a request to the panel of arbitrators (7). Each individual arbitrator reviews all items related to the event and, if he/she is convinced that the original item that was posted slanders B he sends back a message containing the part of A's identity to the computation center (6). If the computation center (6) receives from the arbitrators enough pieces of information to reveal A's identity, then the agreed upon sanction is applied.

Additional embodiments of the invention may comprise different mathematical modules.

Although embodiments of the invention have been described by way of illustration, it will be understood that the invention may be carried out with many variations, modifications, and adaptations, without exceeding the scope of the claims.

BIBLIOGRAPHY

1. M. H. Au, P. P. Tsang, A. Kapadia, and W. Susilo. BLACR: TTP-Free Black-listable Anonymous Credentials with Reputation. Indiana University Technical Report TR695, May 2011.
2. E. Brickell and J. Li. Enhanced privacy id: a direct anonymous attestation scheme with enhanced revocation capabilities. In WPES, pages 21-30. ACM, 2007.
3. J. Camenisch, S. Hohenberger, M. Kohlweiss, A. Lysyanskaya and M. Meyerovich. How to win the clone wars: efficient periodic n-times anonymous authentication. In ACM CCS, pages 201-210, 2006.
4. J. Camenisch and A. Lysyanskaya. Efficient non-transferable anonymous multi-show credential system with optional anonymity revocation. In B. Pfitzmann, editor, Advances in Cryptology EUROCRYPT 2001, volume 2045 of LNCS, pages 93-118. Springer Verlag, 2001.
5. C. Diaz and B. Preneel. Accountable Anonymous Communication. Chapter in Security, Privacy and Trust in Modern Data Management, 2006.
6. R. Dingledine, N. Mathewson and P. Syverson. Tor: The second-generation onion router. In Proceedings of the 13th USENIX Security Symposium, August 2004.
7. S. Dolev, N. Gilboa, and O. Hermoni. "Arbitrators in the Security Infrastructure", 2011.
8. P. Feldman. A practical scheme for non-interactive verifiable secret sharing. In Proceedings of the 28th IEEE Symposium on Foundations of Computer Science, pages 427-437. IEEE, 1987.
9. M. K. Franklin AND M. K. Reiter. Fair Exchange with a semi-trusted Third Party. In Proceedings of the 4th ACM Conference on Computer and Communications Security, 1-6, 1997.
10. N. Gal-Oz, E. Gudes and D. Hendler. A Robust and Knot-Aware Trust-Based Reputation Model. In International Federation for Information, pages 167-182, 2008.
11. J. H. Hoepman. Revocable Privacy. In ENISA Quarterly Review, 5(2):16-17, June 2009.
12. S. Kopsell R. Wendolsky and H. Federrath. Revocable anonymity. In ETRICS'06, 206-220, 2006.
13. A. Shamir. How to share a secret, Commun, ACM, 22, 612-613, 1979.
14. M. Stadler. Cryptographic Protocols for Revocable Privacy. PhD thesis, Swiss Federal Institute of Technology, Zurich, 1996.
15. I. Teranishi, J. Furukawa and K. Sako. k-times anonymous authentication (extended abstract). In Asiacrypt, v. 3329 of LNCS pp 308-322, 2004.
16. P. P. Tsang, M. H. Au, A. Kapadia, and S. W. Smith. PEREA: Towards practical TTP-free revocation in anonymous authentication. In ACM CCS, pp 333-344, ACM, 2008.
17. P. P. Tsang, M. H. Au, A. Kapadia, and S. W. Smith. BLAC: Revoking repeatedly misbehaving anonymous users without relying on TTPs. ACM Trans. Inf. Syst. Secur., 13(4):39, 2010.
18. P. P. Tsang, A. Kapadia, C. Cornelius, and S. W. Smith. Nymble: Blocking misbehaving users in anonymizing networks. IEEE Trans. Dependable Sec. Comput., 8(2):256269, 2011.

The invention claimed is:
1. A method for resolving disputes between users in network communications using digital arbitration, wherein the network comprises members/users, a server, a set of arbitrators and a certificate authority that is used as part of a public key infrastructure or as part of the communication protocol to secure the communication, said method comprising the following steps:
- a) agreeing on a contract between the users, said contract comprising:
  - i. a terms of use agreement, defining what each user may do during the communication;
  - ii. a set of chosen arbitrators; and
  - iii. a digital resource that users receive, in case one of the users violates the agreement;
- b) checking the users digital resource, by the certificate authority, so that the resources, guaranteed in the contract, is partially distributed to each of the arbitrators;
- c) signing a user's public key, by the certificate authority, for future verifications;
- d) appealing to the arbitrators by a first user, if he/she suspects a second user violates the agreement; and
- e) giving the information needed to reconstruct the resource by the set of arbitrators to the first user, if a large enough number of arbitrators agree that the second user actually violated the agreement;

wherein one of the users may be an agency, implemented by a server of the network;
wherein the set of arbitrators in a network is selected from the following group:
1. full members of the network, as the users;
2. external participants, being non-members of the network;
3. members of the central certificate authority; and
4. machines; and further including anonymous user to user network interactions comprising the following steps:
- f) sending to the server, by the user, a message that contains an identifier for the user $ID_U$ and a set of preferred arbitrators ar;
- g) sending from the server a message to the user containing a terms of use agreement and a set AR, containing n arbitrators (n≥2t+1, where t is a system parameter) from ar, where the terms of use contain at least the number of arbitrators n, the threshold t, and the type of the digital goods (resource from the user);
- h) checking the terms of use by the user, and if the user does not agree to the terms of use, the user sends an error message to the server;
- i) using a reputation system to support the users and servers choice of arbitrators;
- j) constructing a random polynomial of degree "t", by a user with digital goods, $A = DG + a_1 x + a_2 x^2 + \ldots + a_t x^t \mod q$, where q is a global prime number, $a_i$ are random and the free coefficient is the digital goods;
- k) constructing a pair of signature key ($SK_U$) and verification key ($VK_U$) by the user, where each message in the communication is signed by the user using the signature key, and verified by the server using the verification key;
- l) sending from the user a message to the certificate authority, containing the polynomial A, a generator g, the user identifier $ID_U$, the verification key $VK_U$ and the Terms of Use;
- m) checking by the certificate authority that the polynomial A is of degree t, and that the value A(0) is a valid digital good;
- n) signing by the certificate authority the user's verification key ($Sig_{CA}(VK_U)$) and the terms of use ($Sig_{CA}(ToU)$), and then building a commitment C for the polynomial A according to a VSS algorithm, $C = \{g, c_0 = g^{DG}, c_1 = g^{a1}, \ldots, c_t = g^{at} \mod p\}$ where p is a prime number, g is a generator of a subgroup of size q in $Z^*_p$ and q|p−1;
- o) sending by the certificate authority the commitment C along with the signatures on the user verification key and the terms of use to the user;
- p) forwarding the message received from the certificate authority to the server, containing the commitment C, the certificate authority's signatures on the user verification key and the certificate authority's signatures on the terms of use, and verifying the signatures and the terms of use by the server;
- q) constructing n shares $\{sh_1 = A(1), sh_2 = A(2), \ldots, sh_n = A(n)\}$, by the user, from the polynomial A, where n is a system parameter set in the terms of use, and n≥2t+1 (where t is the degree of the polynomial);
- r) sending n messages, by the user, one message to each arbitrator $Ar_i$ (1≤i≤n) from the vector AR, containing the identifier of the user $ID_U$, the terms of use, the commitment C, the user verification key $VK_U$ and the $i_{th}$ share (i is the location of the arbitrator in the set AR) $sh_i$;
- s) sending n messages, by the server, one message to each arbitrator $Ar_i$ (1≤i≤n) from the vector AR, containing the identifier of the user $ID_U$, the terms of use, the commitment C, the user verification key $VK_U$ and the index i, where i is the location of the arbitrator in the set AR;
- t) checking, by each arbitrator, that the terms of use, $ID_U$, C and $VK_U$ sent from the server are identical to those sent from the user, and using the commitment C in order to verify that the received share, $sh_i$ from the user, is the correct $i_{th}$ (i received from the server) share;
- u) sending an OK message, by the arbitrator, to the user; and
- v) sending an OK message, by the arbitrator, to the server.

2. The method of claim 1, further comprising the following steps:
- w sending, by the server, to each arbitrator i, the identifier of the user $ID_U$, the messages M and the signatures $Sig_U(M)$;
- x verifying, by each arbitrator i, the signature of the user on the messages, and using f to decide whether the messages violate the terms of use or not; and
- y sending the share $sh_i$ to the server, if the arbitrator decides that the messages do violate the terms of use.

\* \* \* \* \*